US010560479B2

United States Patent
Demirli et al.

(10) Patent No.: US 10,560,479 B2
(45) Date of Patent: Feb. 11, 2020

(54) COMMUNICATION WITH COMPONENT-BASED PRIVACY

(71) Applicant: MINDHIVE INC., New York, NY (US)

(72) Inventors: Oya Demirli, New York, NY (US); George Dalke, Claremont, NH (US)

(73) Assignee: MINDHIVE INC., New York, NY (US)

( * ) Notice: Subject to any disclaimer, the term of this patent is extended or adjusted under 35 U.S.C. 154(b) by 6 days.

(21) Appl. No.: 14/790,658

(22) Filed: Jul. 2, 2015

(65) Prior Publication Data

US 2016/0014160 A1 Jan. 14, 2016

Related U.S. Application Data

(60) Provisional application No. 62/075,580, filed on Nov. 5, 2014, provisional application No. 62/023,484, filed on Jul. 11, 2014.

(51) Int. Cl.
*H04N 7/16* (2011.01)
*G06F 17/30* (2006.01)
(Continued)

(52) U.S. Cl.
CPC .......... *H04L 63/20* (2013.01); *G06F 21/6209* (2013.01); *H04L 51/12* (2013.01)

(58) Field of Classification Search
CPC ....... H04L 63/20; H04L 51/063; H04L 51/12; G06F 21/6209; H04W 12/02
(Continued)

(56) References Cited

U.S. PATENT DOCUMENTS

| | | | | |
|---|---|---|---|---|
| 7,559,022 B2* | 7/2009 | Wisniewski | ............ | H04L 51/14 715/234 |
| 7,707,262 B1* | 4/2010 | Bill | ........................ | G06Q 10/00 709/204 |

(Continued)

FOREIGN PATENT DOCUMENTS

| | | |
|---|---|---|
| WO | 2011031994 A1 | 3/2011 |
| WO | 2014089353 A1 | 6/2014 |

OTHER PUBLICATIONS

Jalal Al-Muhtadi; Routing Through the Mist: Privacy Preserving Communication in Ubiquitous Computing Environments; IEEE; 2002; page.*

(Continued)

*Primary Examiner* — Monjur Rahim
(74) *Attorney, Agent, or Firm* — Brown Rudnick LLP (57) ABSTRACT

The invention relates to assigning privacy permissions to different components of a single piece of content. An author may designate individual components within a piece of content and may also select a privacy level for each component. Components may be shared in a volatile format wherein the distributed copy of a component may have observation, copying, or forwarding restrictions incorporated into the format. By allowing an author to record and create a single piece of content and then select and apply separate privacy parameters to different components within that content, the invention allows the author to quickly document and share experiences with multiple audiences while maintaining the desired level of privacy for each component of the content. By distributing volatile copies of components, systems and methods of the invention allow an author to maintain some control over distribution and use of content on a component level as well.

22 Claims, 10 Drawing Sheets (51) Int. Cl.
  *G06F 7/04* (2006.01)
  *H04L 29/06* (2006.01)
  *G06F 21/62* (2013.01)
  *H04L 12/58* (2006.01)

(58) Field of Classification Search
  USPC .......................................................... 726/27
  See application file for complete search history.

(56) References Cited

U.S. PATENT DOCUMENTS

| | | | | |
|---|---|---|---|---|
| 9,223,995 | B1* | 12/2015 | Lavinio | G06F 21/606 |
| 2004/0143633 | A1* | 7/2004 | McCarty | H04L 12/1813 |
| | | | | 709/206 |
| 2008/0140665 | A1* | 6/2008 | Ariel | G06Q 10/109 |
| 2008/0263357 | A1* | 10/2008 | Boyen | H04L 9/083 |
| | | | | 713/168 |
| 2010/0042690 | A1* | 2/2010 | Wall | G06Q 10/107 |
| | | | | 709/206 |
| 2010/0146583 | A1* | 6/2010 | Prehofer | G06Q 30/02 |
| | | | | 726/1 |
| 2010/0262714 | A1* | 10/2010 | Hiie | H04L 65/4007 |
| | | | | 709/234 |
| 2011/0083101 | A1* | 4/2011 | Sharon | G06F 21/6245 |
| | | | | 715/800 |
| 2011/0296308 | A1* | 12/2011 | Yi | G06F 21/52 |
| | | | | 715/733 |
| 2012/0110680 | A1* | 5/2012 | Oliver | G06F 21/6245 |
| | | | | 726/30 |
| 2013/0145473 | A1* | 6/2013 | Cormode | G06F 21/10 |
| | | | | 726/26 |
| 2013/0174274 | A1* | 7/2013 | Friedman | G06Q 30/0251 |
| | | | | 726/28 |
| 2013/0185252 | A1* | 7/2013 | Palmucci | G06F 17/30011 |
| | | | | 707/608 |
| 2013/0246040 | A1* | 9/2013 | DeLuca | G06Q 10/10 |
| | | | | 704/2 |
| 2014/0089272 | A1* | 3/2014 | Biswas | G06F 17/3089 |
| | | | | 707/692 |
| 2014/0289626 | A1* | 9/2014 | Wu | G06F 17/3074 |
| | | | | 715/716 |
| 2014/0304085 | A1* | 10/2014 | Liu | G06Q 30/02 |
| | | | | 705/14.66 |
| 2015/0188751 | A1* | 7/2015 | Vasseur | H04L 41/0613 |
| | | | | 709/224 |
| 2015/0288662 | A1* | 10/2015 | Bilogrevic | H04L 65/403 |
| | | | | 713/168 |
| 2015/0371057 | A1* | 12/2015 | Ow | H04L 63/10 |
| | | | | 726/28 |
| 2016/0004723 | A1* | 1/2016 | Pretel | G06F 17/30241 |
| | | | | 707/769 |

OTHER PUBLICATIONS

International Search Report and Written Opinion of the International Searching Authority for International Application No. PCT/US2015/039028 dated Oct. 22, 2015 (8 Pages).

* cited by examiner

COMMUNICATION WITH COMPONENT-BASED PRIVACY

CROSS-REFERENCE TO RELATED APPLICATIONS

This application claims priority to, and the benefit of, both U.S. Provisional Patent Application Ser. No. 62/023,484, filed Jul. 11, 2014, and U.S. Provisional Patent Application Ser. No. 62/075,580, filed Nov. 5, 2014, the contents of each of which are incorporated by reference.

FIELD OF THE INVENTION

The invention generally relates to a tool for public and private sharing of content.

BACKGROUND

With the advent of mobile smart phones and other communication devices capable of recording, sending, and receiving text, audio, video, images, and graphics, more and more people are recording and sharing experiences at an ever increasing rate. For example, people may record and share live video from a concert or share their thoughts on world events, as they unfold, with friends and/or strangers around the world. As more individuals augment their everyday experiences with technology by capturing and sharing thoughts and events in the moment, the need for instant communication has increased. Being the first to comment on an event or share a new video or photograph can carry personal import and in some cases, real value to people and businesses.

At the same time, the world of mobile communication has become more complex with individuals wanting and often needing to determine, with great detail, the audience for their content (e.g., public vs. private content). The costs of publically sharing private content (e.g., a compromising photograph) can be significant to an individual's private and professional life and discretion in audience selection is accordingly a major concern for individuals.

In practice, these two drivers are often at odds with each other. The instantaneous capture and sharing of experiences may be slowed by the necessity of selecting the appropriate audience for the content. Currently, an author must assign privacy rights to each piece of content and send it to the desired group of receivers as a public or private message. This can lead to the time consuming process of creating and/or editing a separate piece of content for each audience, taking the author out of the moment and distracting from the experience. In other instances, an author may have to tailor a single piece of content to fit multiple different audiences (public and private) which can stifle to author's ability to connect with either audience. In some circumstances, the desire to share in real-time can lead to the accidental public sharing of private data, with significant consequences.

SUMMARY

The invention provides a social media application allowing a user to share different components of a single file or piece of social media content with different groups of people. For example, an author may create and share a single file comprising a video component, an audio component, and text based comments. Systems and methods of the invention allow the author to, selectively share each of the components of the single file so that certain individuals may view only the visual component, certain individuals may only hear the audio, and other individuals may see and hear all components. The invention allows an author to tailor the way a number of different audiences experience the same piece of social media content, saving embarrassment and other negative effects associated with public disclosure of private information while still enjoying the benefits of a robust social media presence.

The invention generally relates to tools to enable an author to assign multiple privacy and response permissions to a single message or piece of content by dividing the message or content into components. Content may include, for example, audio, video, text, images, graphics, physical gestures or movements, sensory inputs (e.g., body temperature indicating feelings and emotions) or any combination thereof. In some instances, individuals may share, for example, a single piece of content which may include a video component with audio, text, and graphic annotations overlaid thereon as additional components. Systems and methods of the invention allow an author of such content to apply a different privacy parameter for each component of the content, thereby enabling the author to select a different audience for each individual component. Another goal of the invention is to provide tools to an author for identifying components within a single piece of content. By allowing an author to record and create a single piece of content and then select and apply separate privacy parameters to different components within that content, the invention allows the author to quickly document and share experiences with multiple audiences. The invention enables an author of content to avoid recording multiple, separate messages for multiple audiences or tailoring a single piece of content to fit multiple audiences. Instead an author may add a private comment, directed at a specific individual or group to a video they wish to share publically and share the complete piece of content at once with each component being directed to the appropriate audience.

Systems and methods of the invention may relate to a computing device comprising at least a processor coupled to a tangible, non-transitory memory. The computing device may be, for example, a mobile device (e.g., mobile telephone or tablet computer), a wearable computing device, an augmented reality device, or a server computer. A computing device may include various input/output devices (e.g., a display, a camera, speakers, a microphone, a touchscreen, a keyboard, gestural or sensory input devices, or any combination thereof). The computing device may be used to generate, record, or store content or content components according to systems and methods of the invention.

A piece of content may have any number of components, for example, 1, 10 or 100. Content, according to the invention, may be generated from individual components. For example, an author may record an image component and then add a text component (e.g., a caption) in order to create a piece of content comprising two components. In some instances, content may be provided, recorded, or created as a single unit and subsequently divided (e.g., spatially or temporally) into components. For example, an author may record a 2 minute section of video and then designate a 30 second clip as one component and the rest of the video as another component. In another example, an author may provide a photograph and designate a subsection of the image (e.g., the upper left corner) as a separate component from the remainder of the image. Components of a piece of content may be designated by an author and may be received as component designations and used to define the components. These operations may be carried out by a computing device and may utilize input/output devices of the computing device.

According to systems and methods of the invention, privacy parameters may be used which allow an author to choose to make content public or private at a component level. For private content, an author may grant viewing and/or editing permissions for each component of a piece of content to an audience such as an individual or a population of viewers. A privacy parameter may be a set of permissions which allow a select audience to receive and/or observe one or more components of the content or a volatile copy thereof. A privacy parameter can be a population characteristic such as age, gender, etc. allowing only people within the selected group (e.g., males between 20 and 25 years old) to observe the content. In certain instances, components may inherit privacy parameters from other components which are honored in additional privacy parameters assigned by the author.

Content and components may be shared or distributed in a variety of ways according to the invention including, for example, by uploading content components from an author's computing device to a server from which an audience may download the content components onto their computing devices; by sending the content components directly between an author's computing device and the audience's computing devices; or where content components are uploaded to a server which in turn sends the components to the appropriate audience based on the privacy parameter associated with each component. In certain embodiments, a privacy parameter may include a password, biometric and other sensory information. The privacy parameter can be entered into a computing device by the author and can be sent from the computing associated with a component and used by systems and methods of the invention to govern distribution of the component to the audience defined by the privacy parameter. An individual's inclusion within the designated audience for a content component may be verified at the server or at the author or end-user's computing device before permission to observe the content component is granted. In order to verify audience membership, the privacy parameter associated with the content component may be compared with user credentials for the prospective audience member. User credentials may include, for example, a user name, password, electronic mail address, phone number, age, gender, interests, physical attributes, geographic location, interests, nationality, biometric and other sensory information.

Content components, according to the invention, may be shared publically or privately, with or without security and/or privacy settings. In certain embodiments, content components may be distributed to intended audiences in the format of a volatile copy (e.g., that cannot be copied or forwarded or that may become unreadable after a certain amount of time after receipt, a certain number of viewings, a certain amount of viewing time, or some combination thereof). In some embodiments, these volatility parameters may selected by the content component's author and may be input into a computing device through an input device such as a keyboard or touchscreen. Accordingly, content components distributed to a private audience cannot be further distributed and an author may maintain control over the end audience for private content. Transitions between pieces of content or components thereof may be accompanied by transition effects.

In certain instances, a receiving audience member may edit, annotate, comment, or otherwise respond to a content component. The content component and response(s) may form a thread or conversation. In certain embodiments, observation of a thread may be restricted to the audience originally defined by the content component's author based on the privacy parameter they associated with that content component. In some instances, the privacy parameter may be applied only to the original content component while subsequent responses may be treated as new content components to which each response's author may assign their own privacy parameters. In certain embodiments, when an audience member attempts to send a content component or thread to a restricted party outside of the original audience, then an alarm may be sent to the content component's author requesting permission for the thread to be observed by the restricted party. The content component author may respond to the alarm by granting permission or denying permission and/or providing volatility parameters for the copy to be received by the restricted party.

In certain cases, the content components may only be observed through certain computing devices or by a designated viewer/synthesizer computer program. In such cases, the security, privacy, and/or volatility parameters may be applied by computing device or the viewer/synthesizer computer program.

According to systems and methods of the invention, computing devices (e.g., a content component author's computing device, a server, and/or an audience member's computing device) may be in communication with each other through a communication network. A communication network may include, for example, a local area network, a wide area network, the internet, a mobile telecommunications network, or a combination thereof.

In certain aspects, the invention provides a method for sharing content over a communication network. The method includes providing content where the content further comprises at least a first component and a second component. The method further includes receiving a first privacy parameter for the first component; receiving a second privacy parameter for the second component; distributing a copy of the first component to a first audience according to the first privacy parameter; and distributing a copy of the second component to a second audience according to the second privacy parameter.

In certain embodiments, methods may include the steps of receiving a component designation and defining at least the first component and the second component according to the component designation. The copy of the first component may be a volatile copy. In some embodiments, the copy of the first component may be observed for only a set amount of time. Methods of the invention may include receiving the set amount of time. In some embodiments, the copy of the first component may be observed for only a set number of sessions. Methods may include receiving the set number of sessions.

In various embodiments, the copy of the first component cannot be copied by the first audience. In certain embodiments, only the first audience can observe the copy of the first component. The first component may include an image, video, text, or audio. The providing, receiving, and distributing steps may be performed by a computer system comprising a processor coupled to a non-transitory memory. The computing device can be a mobile device, a wearable computing device, a server, or an augmented reality device. Certain methods may include receiving a transition effect designation and distributing a transition effect, according to the transition effect designation, to an overlap audience comprising individuals belonging to both the first and second audiences wherein the transition effect is configured to be observed by the overlap audience between observation of the first component and observation of the second component.

In certain aspects, the invention provides a system for sharing content over a communication network. The system includes a computing device coupled to a communication network and comprising a tangible, non-transitory memory coupled to a processor. The system is operable to record content, where the content comprises at least a first component and a second component. The system is further operable to receive a first privacy parameter for the first component; receive a second privacy parameter for the second component; distribute a copy of the first component to a first audience according to the first privacy parameter; and distribute a copy of the second component to a second audience according to the second privacy parameter.

In certain embodiments, the system may be operable to receive a component designation; and define at least the first component and the second component according to the component designation. The copy of the first component may be a volatile copy. In various embodiments, the copy of the first component may only be observed for a set amount of time and the system may be further operable to receive the set amount of time. In certain embodiments, the copy of the first component can be observed for only a set number of sessions and the system may be further operable to receive the set number of sessions. In certain embodiments, the copy of the first component cannot be copied by the first audience. In some embodiments, only the first audience can observe the copy of the first component. The first component may be an image, video, text, or audio. The computing device may be a mobile device, a wearable computing device, an augmented reality device, or a server.

In certain embodiments, systems of the invention are operable to receive a transition effect designation and distribute a transition effect, according to the transition effect designation, to an overlap audience comprising individuals belonging to both the first and second audiences where the transition effect is configured to be observed by the overlap audience between observation of the first component and observation of the second component.

DETAILED DESCRIPTION

The invention provides systems and methods for sharing components of a single piece of content according to different privacy parameters for each component. The invention also relates to designating separate components within a single piece of content or dividing the content into separate components. By allowing an author to selectively share different components of a piece of content with different audiences, systems and methods of the invention allow an author to quickly communicate and share experiences with multiple audiences while maintaining the appropriate level of privacy for each audience. The invention provides tools for maintaining author control over privacy and distribution of a content component by allowing for the distribution of volatile copies of content components with volatility parameters which may be selected by the author. By building in selectable ephemerality and/or copying and forwarding restrictions, secondary sharing of private content may be prevented.

Figure 9:
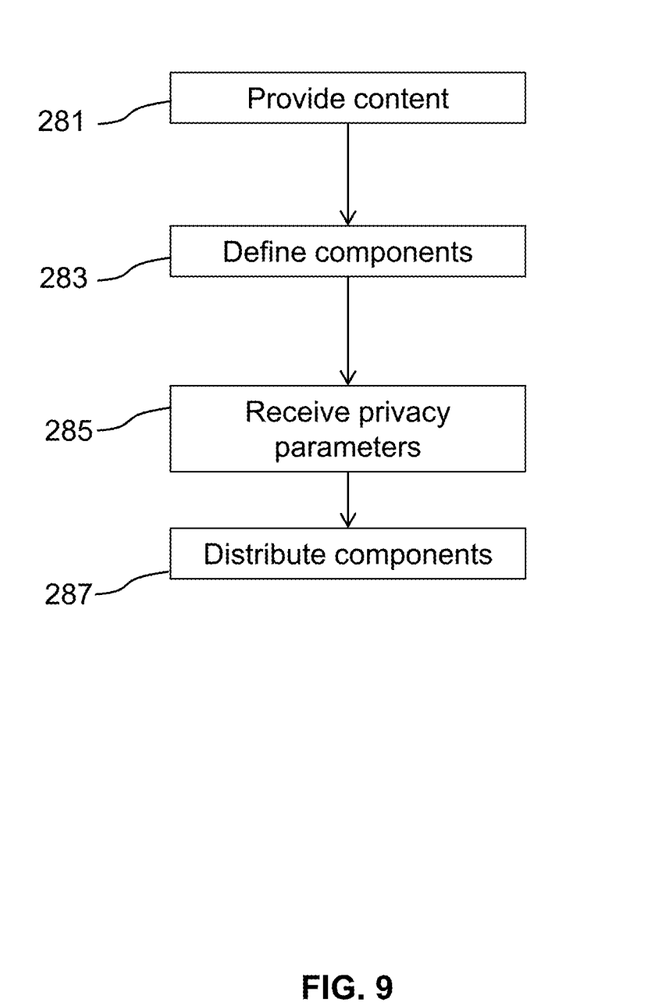
FIG. 9 diagrams steps of methods of the invention

FIG. 9 provides a diagram of steps involved in certain embodiments of the invention. Methods of the invention may include providing content 281, which may be created on a computing device 101 (e.g., a video recording using a mobile phone's video camera) or downloaded from another source (e.g., an image or .GIF file downloaded from the internet), for example. Content components may then be defined 282 within the content and privacy parameters for each defined component may be received 285. Content components may be defined according to component designations received from an author (e.g., input into a computing device 101 through an input/output device). Privacy parameters may also be received from an author. Defined components may then be distributed 287 to an appropriate audience based on the privacy parameters associated with each component.

Figure 1:
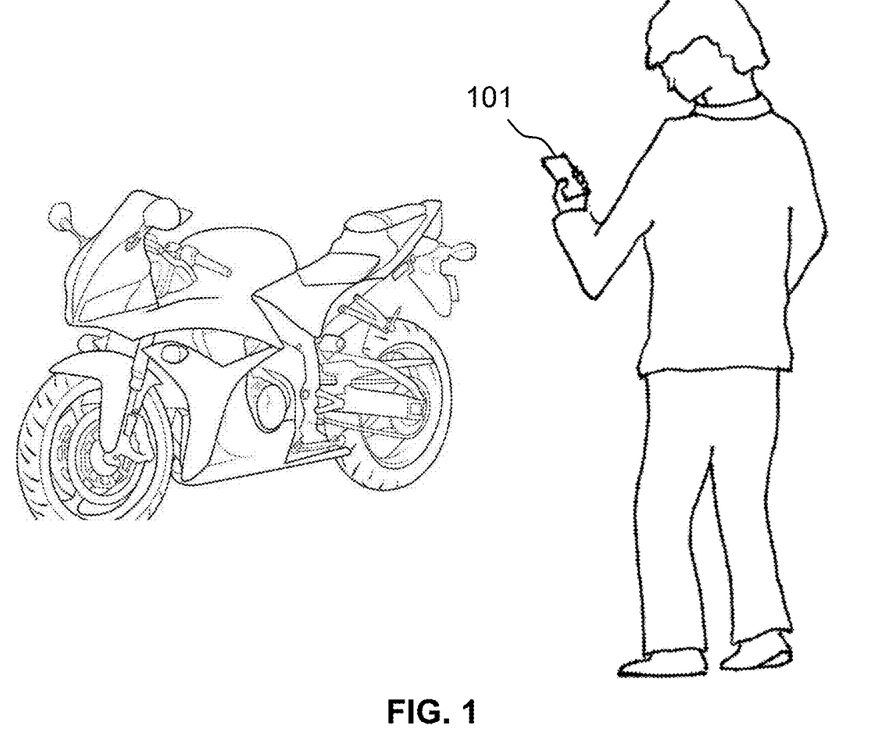
FIG. 1 shows use of a computing device to generate new content.

Content components may include, for example, pre-existing, generated, or captured still images, audio, video, text, verbal annotations, vector graphics, rastor graphics, physical gestures or movements, sensory inputs (e.g., body temperature indicating feelings and emotions) or any combination thereof. Content may be generated or captured using an input device (described later) on a mobile device or other computing device 101. In preferred embodiments, content is a computer file capable of being read by a computing device 101 or server 511. A variety of known programs or applications may be used to generate or capture content and content may be in a variety of known file types including, for example, JPEG, GIF, MPEG, Quick Time File Format (QTFF), ASCII, UTF-8, MIME, .TXT, XML, HTML, PDF, Rich Text Format (RTF), and WordPerfect. FIG. 1 shows a computing device 101 being used to generate new content by capturing a digital image.

Figure 2:
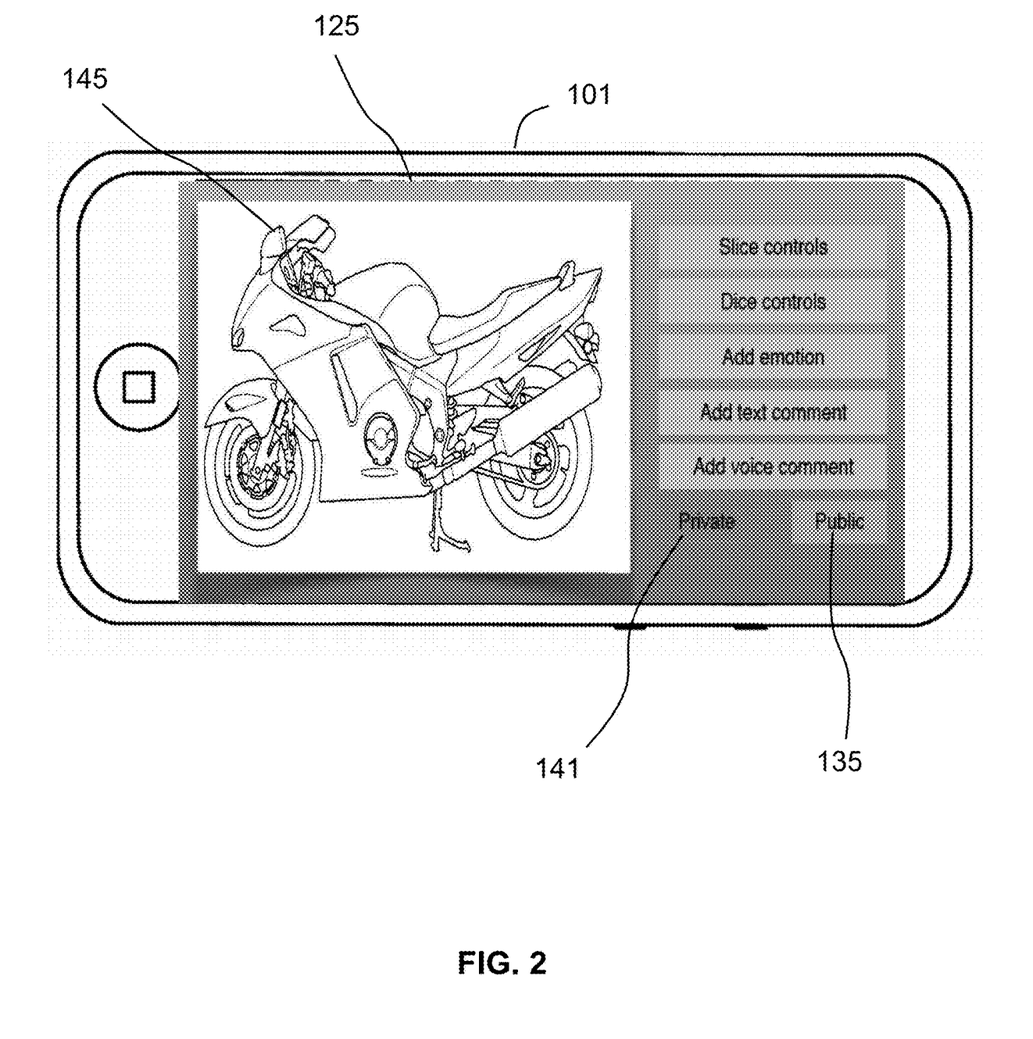
FIG. 2 shows an exemplary privacy parameter selection screen on a computing device display.
Figure 3:
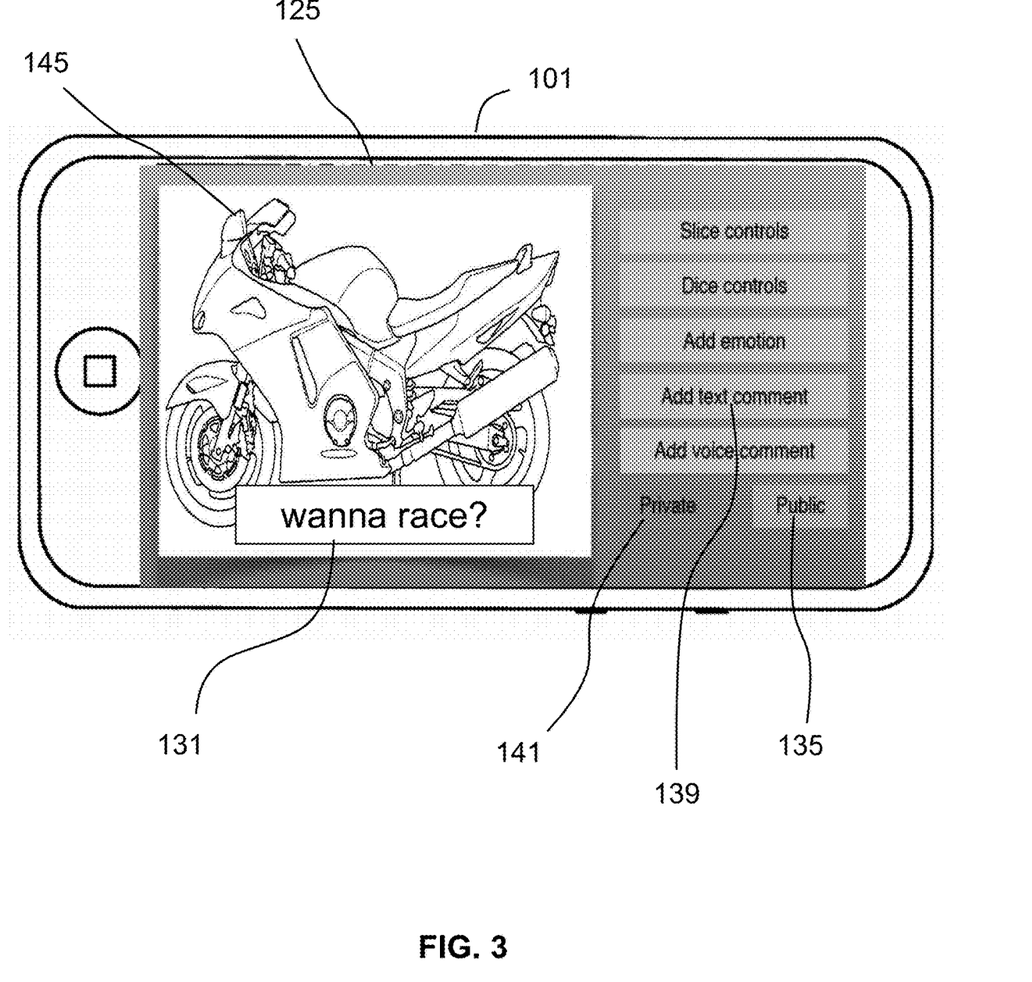
FIG. 3 shows an exemplary component designation and privacy parameter selection screen on a computing device display.
Figure 4:
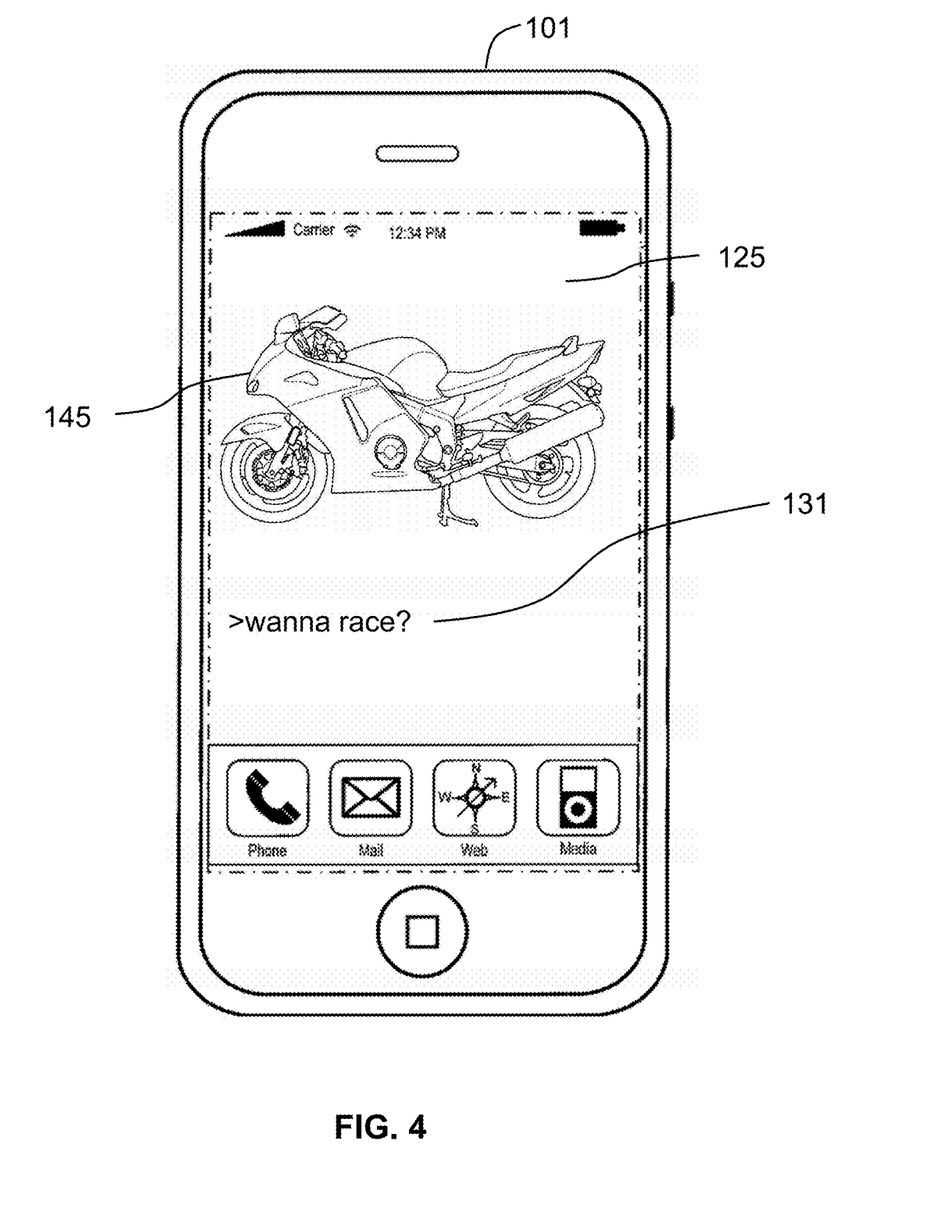
FIG. 4 shows an exemplary computing device displaying multi-component content.
Figure 5:
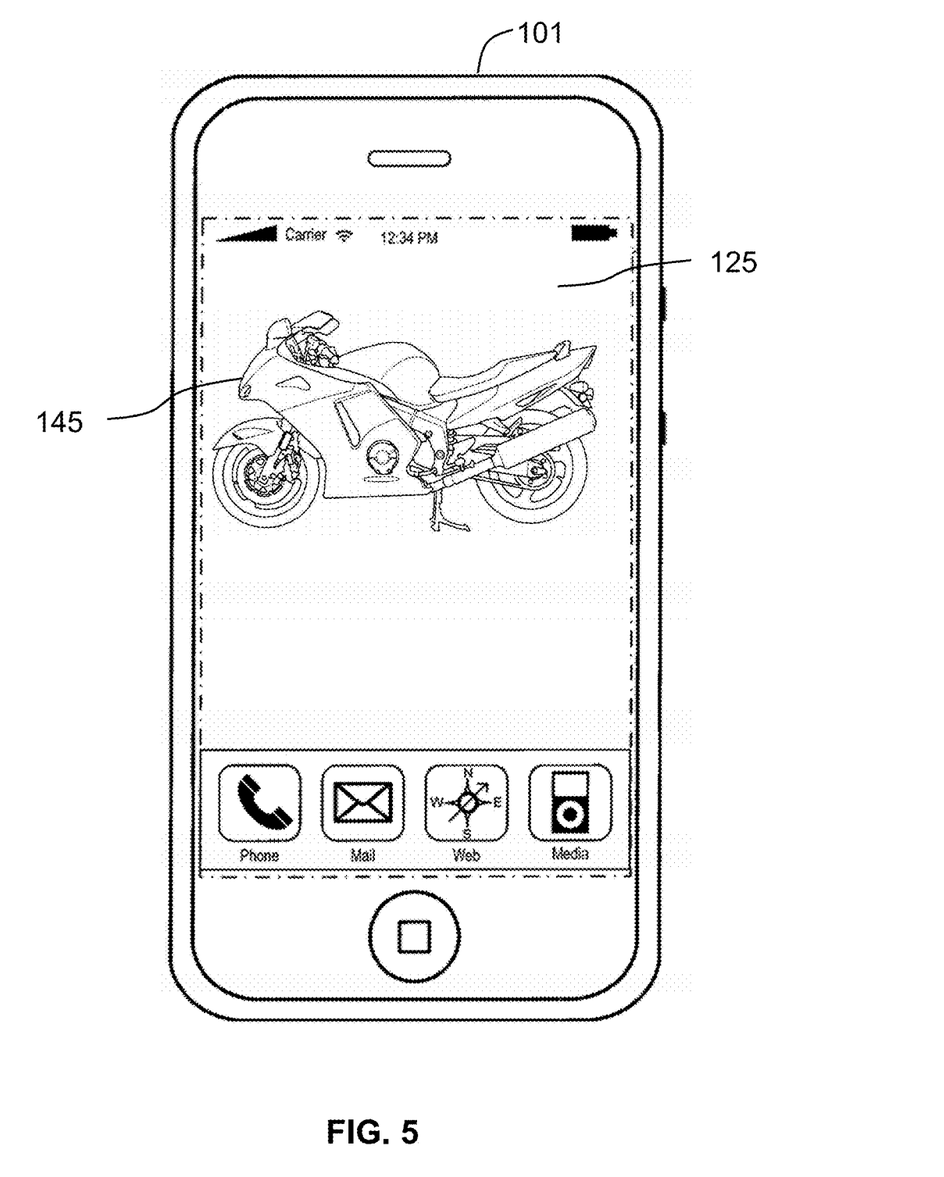
FIG. 5 shows an exemplary computing device displaying content comprising a single component.

A piece of content may have any number of components, for example, 1, 10 or 100. Content, according to the invention, may be generated from individual components or may be divided into separate components. Different components of a single piece of content may be of the same or different types. For example, a piece of content may include a video component, a text component, and an audio component. In another example, a piece of content may include two separate image components or two separate text components. An example of creating content from multiple components includes an author recording an image component and then adding a text component (e.g., a caption) in order to create a piece of content comprising two components. In certain embodiments, content components may include annotation, augmentation, overlay, or a change to another component including, for example, audio annotation, text, vector graphics, rastor graphics, video, animation, gestures for wearable computing devices 101, instructions, code for two-dimensional or three-dimensional environments, or a combination thereof. FIGS. 2-3 illustrate system and methods of the invention, implemented on a computing device 101, wherein content is created from two separate components. In the example shown in FIGS. 2-3, the display 125 of the computing device 101 shows a first component 145 (an image of a motorcycle) to which an author adds a second component 131 (the text: "wanna race"). The display 125 may comprise a touch screen element as found on many commercially available mobile telephones. In the example shown in FIGS. 2-3, a touch screen display input/output device includes a button for adding a text component 139 and a provision for associating a privacy parameter with each component. In certain embodiments, a content component may be selected or defined using an input device such as a touchscreen, and an author may then indicate a privacy parameter for that component by selecting a public 135 or private 141 indicator on the touchscreen. For example, in the example shown in FIGS. 2-5, the first component 145 may be designated public and shared without any privacy parameters while the second component 131 may be designated private and shared according to certain privacy parameters (e.g., with a friend of the author, or the author's motorcycle racing club). FIG. 4 shows an exemplary display 125 of a computing device 101 wherein the final content has been received and is displayed. In FIG. 4, the audience, or user of the computing device is within the intended audience (i.e., falls within the privacy parameters) for both the first component 145 and the second component 131 that make up the content. If an individual only met the privacy parameters for the first component 145 and not the second component 131, then they would be able to observe only the first component 145, in which case the content would be displayed on a computing device 101 display 125 as shown in FIG. 5.

In some instances, content may be provided, recorded, or created as a single unit and subsequently divided into components. In certain embodiments, a piece of content may be divided temporally. For example, an author may record a 2 minute audio clip and then designate a 30 second section of the clip as one component and the rest of the audio as another component. The author may then designate each component with a different privacy parameter so that some audiences may observe the entire audio clip, which may include private information while others may only hear the 30 second section which may omit the private information.

In certain embodiments, components of a piece of content may be designated by an author through the input of component designations which are used to define the components. These operations may be carried out by a computing device and may utilize input/output devices of the computing device. In some embodiments, a piece of content may be divided spatially into components. For example, an author may provide a photograph (e.g., an image of a boy and a girl next to each other) and designate a portion of the image as a separate component (e.g., the portion of the image depicting the girl) from the remainder of the image. A different privacy parameter can then be assigned to each component of the image so that some audiences might view the entire image while others may only view one component of the image. Component designations may be input in a variety of manners including, for example, in the spatial partitioning described above, an author may display the image on a computing device 101 display 125 with a touch screen and may use a stylus or finger to designate a separate component by drawing an enclosed shape over a portion of the image on the display 125. That portion of the image may then be designated as one component while the rest of the image is another component, each of which may receive different privacy parameters.

In certain embodiments, systems and methods of the invention may relate to pre-designating components within a piece of content and prompt an author for privacy parameters for each component. For example, a computing device 101 may divide a piece of content based on different media types within a piece of content (e.g., designating an image with text overlay as an image component and a text component).

Figure 6:
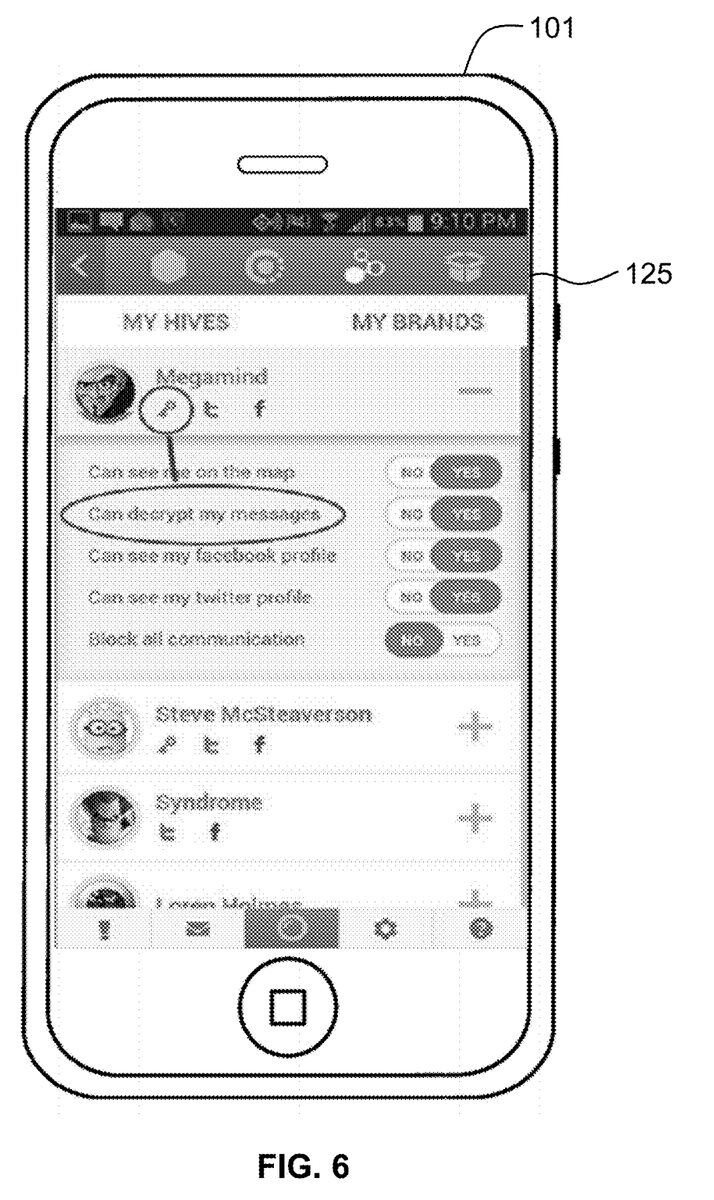
FIG. 6 shows an exemplary computing device displaying a privacy parameter selection screen.

Content components may be assigned a privacy parameter or may have no privacy parameters (i.e., public content). In some embodiments, an author may create a privacy parameter associated with a component of content input that parameter into a computing device to associate with the designated component. Privacy parameters may define an audience for a content component. In certain embodiments, an audience may refer to the individual or group of individuals whom the author intends a content component to be observed by. A privacy parameter may be a selection of one or more individuals or users whom the author has authorized to receive the content as a designated audience. A privacy parameter may also be a set of criteria or population characteristics which define a group that the author has authorized to receive the content. Examples of criteria or population characteristics include, for example, age, gender, interests, physical attributes, geographic location, education, or nationality. In certain embodiments, a privacy parameter may include biometric and other sensory information. FIG. 6 illustrates an embodiment wherein a computing device 101 with a display 125 is showing an exemplary privacy parameter selection screen. As depicted in FIG. 6, an author may identify an audience for private designated content by toggling a button on a touchscreen indicating whether or not an individual user may decrypt messages from the author. In this example, an author can preselect an audience able to observe content components the author designates as private through an input method such as those depicted in FIGS. 2-3.

Figure 8:
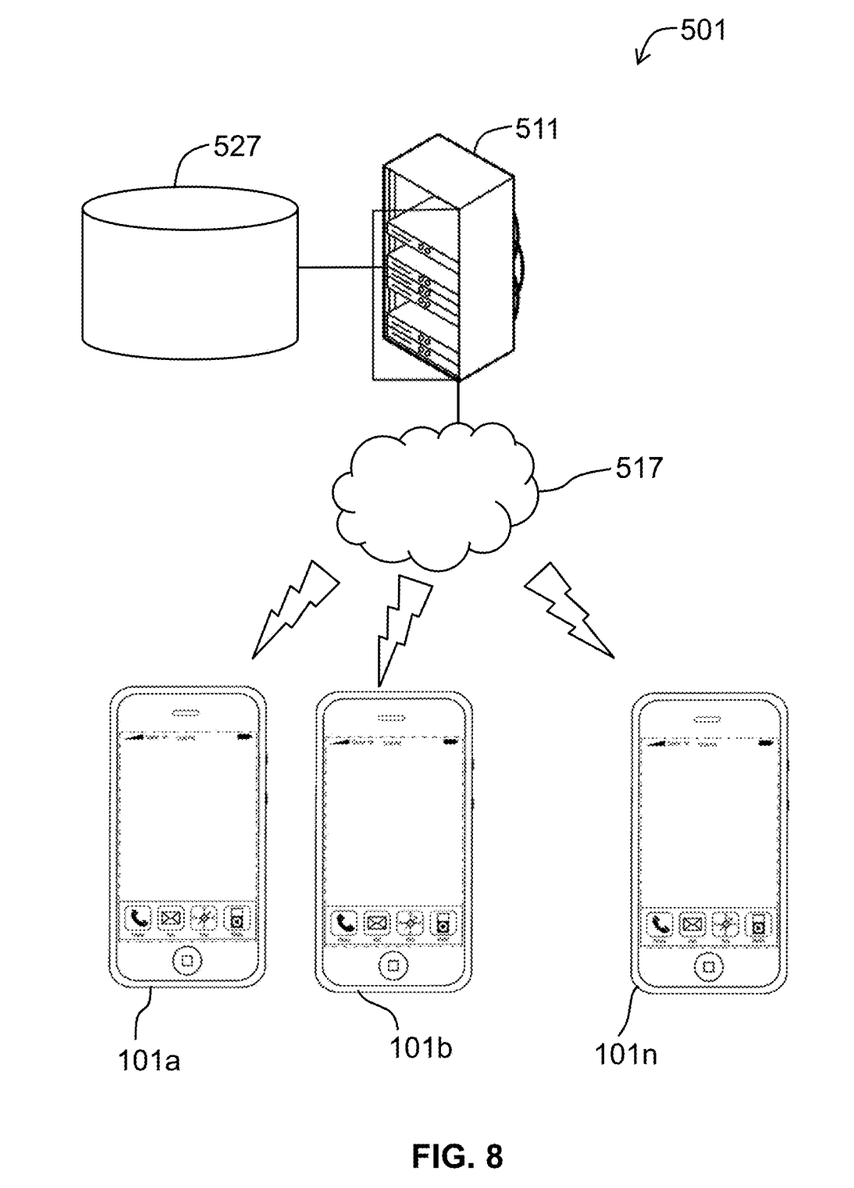
FIG. 8 shows a system for sharing public and private content over a communication network.

In certain embodiments, content and content components may be shared or distributed by uploading content components from an author's computing device 101, through a communication network 517, to a server 511 from which an audience may download the content components onto their computing devices 101. In some embodiments, once uploaded to a server 511, the server 511 may send the components to the appropriate audiences through a communication network 517 based on the privacy parameter associated with each component. An exemplary server 511 implemented system 501 of the invention is depicted in FIG. 8 wherein multiple computing devices 101a, 101b . . . 101n, including a server 511 with a data storage device 527, are coupled to a communication network 511 through which they may exchange data. The server 511 may store received data including, privacy parameters, content, content components, volatility parameters, component designations, and user credentials.

In certain embodiments, content components may be distributed by sending the content components directly between an author's computing device 101 and the computing devices 101 of the audience. According to certain systems and methods of the invention, content transferred among computing devices 101, including servers 511, may be compressed and/or encrypted using a variety of methods known in the art including, for example, the Advanced Encryption Standard (AES) specification and lossless or lossy data compression methods. Servers 511 according to the invention can refer to a computing device 101 including a tangible, non-transitory memory coupled to a processor and may be coupled to a communication network 517, or may include, for example, Amazon Web Services, cloud storage, or other computer-readable storage. A communication network 517 may include a local area network, a wide area network, or a mobile telecommunications network.

In certain embodiments, volatility parameters may be associated with content components. In some instances, these volatility parameters may be static, may be received from an author and assigned to a specific content component, or may be assigned based on privacy parameter (e.g., one volatility parameter for all private components and another for all public components). Volatility parameters may relate to the viewing time, number of views, or lifespan of distributed content components. In some embodiments, components (public, private, or both) may only be distributed other than the author in a volatile format. In certain embodiments, content may be formatted so that it can only be compiled from components and/or viewed using a viewer/synthesizer program or on a computing device 101 of an audience member. In certain embodiments, privacy parameters and/or volatility parameters may be enforced by a distributing server 511, an author's computing device 101, the computing device 101 of an audience member, and/or a viewer/synthesizer program. In certain embodiments, the computing device and/or the viewer synthesizer program may have system write permission, and may erase the content upon expiration of a volatility parameter. In some embodiments, the computing device and/or the viewer synthesizer program may refuse to display the content upon expiration of a volatility parameter. In certain embodiments, the computing device and/or the viewer synthesizer program can periodically review the status of volatile data and apply the restrictions or update the status.

Figure 7:
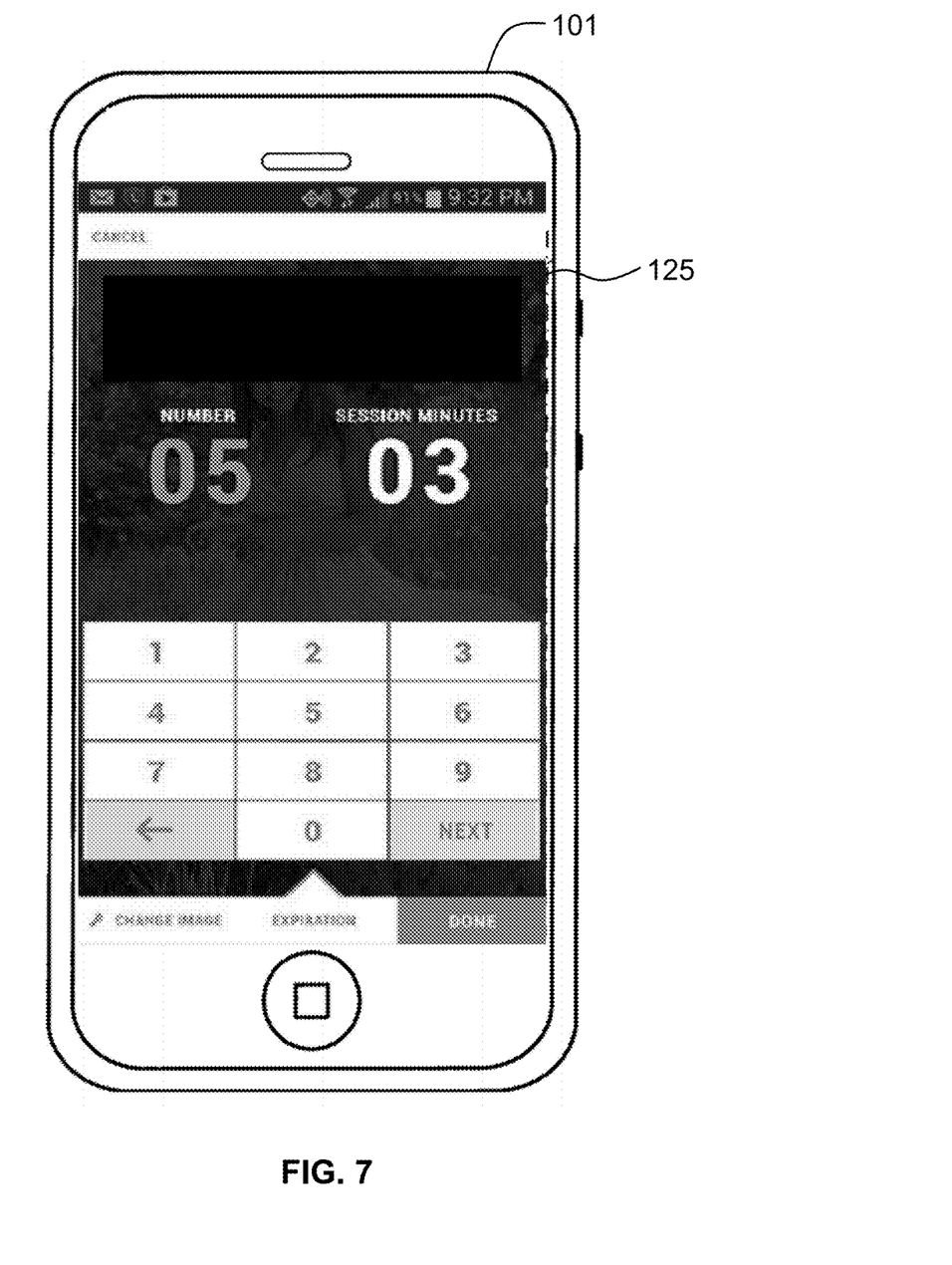
FIG. 7 shows an exemplary volatility parameter selection screen on a computing device display.

In various embodiments, a downloaded copy of content may not be for example, shared, transferred, or copied. Volatile copies of content may have a preset lifespan after which the file is expunged from the computing device 101 on which it is stored or corrupted and made unreadable. In certain embodiments, volatile copies may allow only a limited number of observations by the audience. For example, a volatile copy of content may be distributed to an audience in a volatile format which allows the audience to observe the content five times for thirty seconds each time. Number of observations and/or time of observation limitations, as described above, may be preset or may be selected for a piece of content, a component, or group of components by an author. For example, an author may, upon providing a content component (e.g., taking a digital photograph, entering a text comment, or identifying an audio clip component), set one or more volatility parameters including a preselected amount of time for observation or a preselected number of observations. These volatility parameters may be applied, for example, on a content basis or on an audience basis. For example, an author may set a single volatility parameter (e.g., a preselected number of observations) for all audiences for an individual component or piece of content, or may set a single volatility parameter for all components sent to a particular audience. FIG. 7 illustrates an exemplary embodiment of a computing device 101 with a display 125 allowing a user to set volatility parameters including a number of observation sessions and the amount of time for each session.

In certain embodiments systems and methods of the invention may include the creation of an account in order to access and share content using the system or methods of the invention. Creation of an account may include entering user credentials into a computing device 101 and can include creating a user name to associate with the credentials. These user credentials can be uploaded through the communication network 517 to a server 511 and stored in the server's memory or may be received by a computing device 101 and stored in its memory. When a privacy parameter is applied to a content component by an author, the privacy parameter may be compared to a putative audience member's user credentials to determine whether or not they fall within the privacy parameter and can observe the component. This comparison may be performed in a variety of ways depending on the method of distribution. For example, if the component is sent directly from an author's computing device 101, the computing device may compare the privacy parameter for the component to various user credentials stored in its memory or may receive user credentials from a server 511 or from putative audience members' computing devices 101 before comparing them to the privacy parameter. Upon comparing, the computing device may determine an audience for the content and distribute the component to the audience. Where components are uploaded to a server 511, the server 511 may also receive a privacy parameter associated with the component and may compare the privacy parameter to user credentials stored in its memory or received from putative audience members and, upon comparing, distribute the component to individuals whose user credentials match the privacy parameter for the component. In certain embodiments, observation permission may be determined at the end user level wherein a putative audience member may receive a copy of the component which can only be observed with a viewer/synthesizer program on the user's computing device 101. The putative audience member may also receive a privacy parameter associated with the component which the putative audience member's computing device may compare to her user credentials which may be stored on the computing device's memory. Then, the putative audience member's viewer/synthesizer program may only open the content component for observation if the privacy parameter matches the putative audience member's user credentials.

In certain embodiments, a receiving audience member may edit, annotate, comment, or otherwise respond to a content component. The content component and response(s) may form a thread or conversation. In certain embodiments, observation of a thread or the components thereof may be restricted to the audience originally defined by the content component's author based on the privacy parameter they associated with that content component. In some instances, the privacy parameter may be applied only to the original content component while subsequent responses may be treated as new content components to which each response's author may assign their own privacy parameters. In certain embodiments, when an audience member desires or attempts to send a content component or thread to a restricted party outside of the original audience the audience member's computing device 101 or the server 511 may send a notification, through the communication network 517 to the author seeking approval for observation by a party outside of the originally intended audience to view the component. The notification may be sent, for example, as an electronic mail, a text message, or through a dedicated portal to a computing device 101 (e.g., an author's mobile telephone) over a communication network 517. The computing device 101, having received a notification, may identify the new putative audience based on user credentials and/or prompt the author for permission to release the component to the requestor. In various embodiments, the author may send a one-time authorization to release a private component to a particular audience outside of the original privacy parameter. In some embodiments, an author may alter the privacy parameter associated with the component (e.g., change a component from private to public). In certain embodiments, where a particular audience has permission to view some components of a piece of content and not others, the components which the audience does not have permission to observe may be hidden so that the restricted audience is unaware of the additional, restricted components.

In certain embodiments, transition effects may be provided to enhance transitions between various pieces of content, multiple privacy parameters, or different components within an individual piece of content. For example, an audience member may view a piece of content on a computing device wherein the content contains multiple components with different privacy parameters. A piece of content may contain a public component such as text comment about a concert that the author attended, along with a private component, such as an image of the author with a girl at the concert. An audience member may initially observe a public component of the piece of content on a computing device 101 and, if they have permission to view the private component, may interact with their computing device through an input/output device 305 to transition between the public component and private component. An individual belonging to more than one audience (e.g., public and private) may be referred to as an overlap audience. Transition effects can provide overlap audiences with a transition between content viewable by a first audience and content viewable by a second audience where the overlap audience comprises individuals belonging to both the first and second audiences.

Transition effects may include visual effects such as a scratching effect wherein the user, through a touchscreen or other input/output device 305, is shown a visual representation of scratching through a first component to reveal a second component as the user swipes their finger, drags a mouse pointer, or otherwise interacts with their computing device 101. Transition effects may include visual effects (e.g. scratching, peeling, tearing, fading, swiping in a direction, or minimizing/maximizing) as well as audio effects (e.g., a scratching sound accompanying the visual scratching effect). Transition effects may be selected by a content author or an audience member viewing a piece of content and may be applied to individual pieces of content or set generally for all pieces of content or groups of content. A single piece of content may comprise multiple different transition effects to transition between multiple components. In certain embodiments, a transition effect may be selected by an author to occur at a selected time (e.g., after an audience member has viewed the first component for a set amount of time or at a certain time of day) or may be initiated by the audience member (e.g., the swiping interaction described above).

In various embodiments, systems 501 and methods of the invention may relate to a communication network 517 which allows a server 511 coupled to a data storage device 527 and other computing devices 101a, 101b, . . . , 101n to transfer data amongst themselves. This data can include content components, privacy parameters, volatility parameters, volatile copies of content components, component designations, and/or user credentials, for example. See FIG. 8. Data can be stored in the memory of any computing device including the server's 511 internal memory 307 or in a data storage device 527. Computing devices 101a, 101b . . . 101n according to systems and methods of the invention may be operable to send, receive, and store content components, volatile content, editing parameters, notifications, content identifiers, volatility parameters, content requests, user credentials, component designations and/or privacy parameters.

Figure 10:
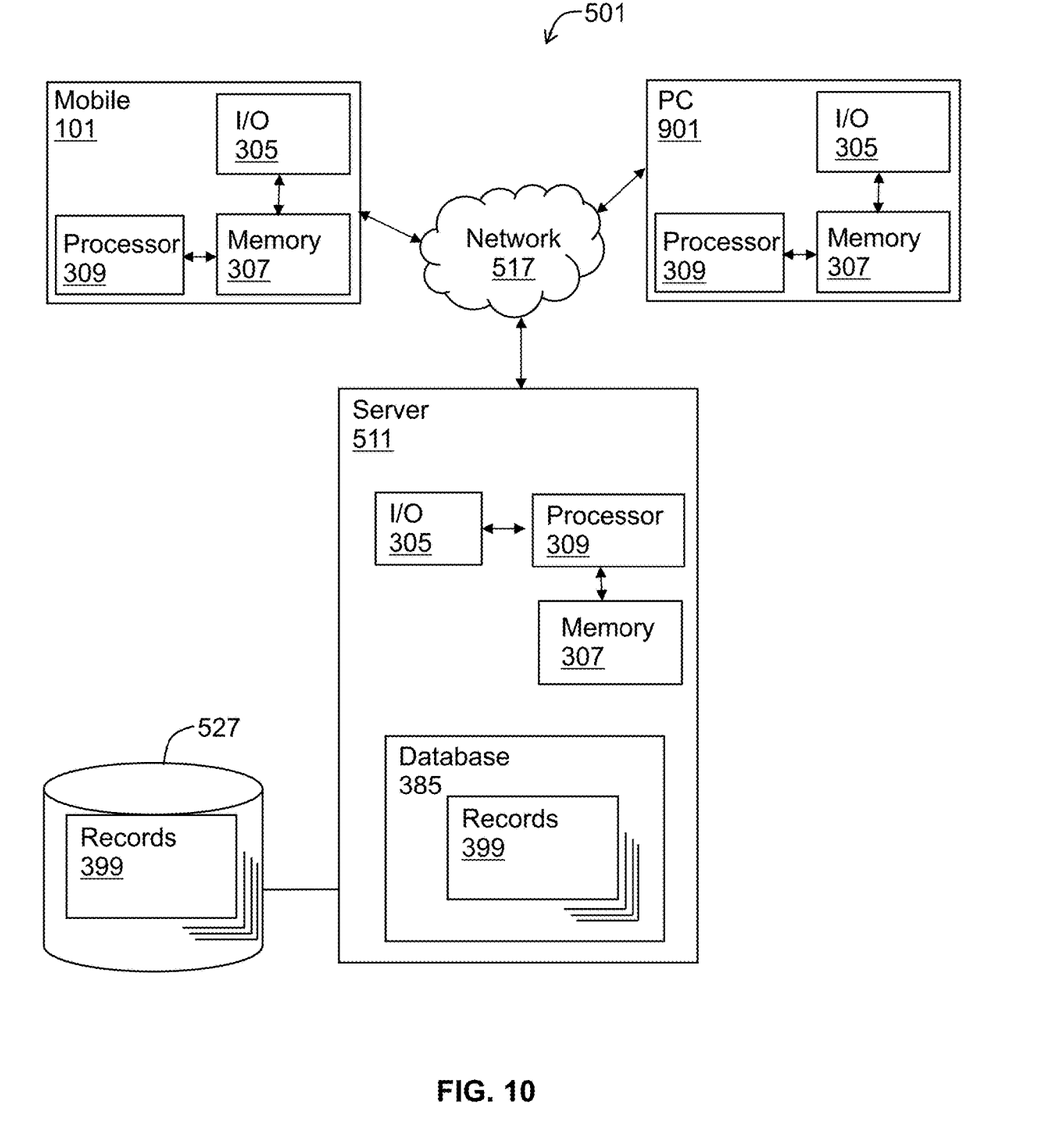
FIG. 10 gives a more detailed schematic of components that may appear within a system.

In a preferred embodiment, computing devices 101 according to the invention may provide a user, editor, or author, with an intuitive graphical user interface (GUI). See FIGS. 2-7. FIG. 10 gives a more detailed schematic of components that may appear within system 501. System 501 preferably includes at least one server computer system 511 operable to communicate with at least one computing device 101a, 101b via a communication network 517. Sever 511 may be provided with a database 385 (e.g., partially or wholly within memory 307, storage 527, both, or other) for storing records 399 including, for example, content components, privacy parameters, volatility parameters, volatile copies of content components, component designations, and/or user credentials where useful for performing the methodologies described herein. Optionally, storage 527 may be associated with system 501. A server 511 or computing device 101 according to systems and methods of the invention generally includes at least one processor 309 coupled to a memory 307 via a bus and input or output devices 305.

As one skilled in the art would recognize as necessary or best-suited for the systems and methods of the invention, systems and methods of the invention include one or more servers 511 and/or computing devices 101 that may include one or more of processor 309 (e.g., a central processing unit (CPU), a graphics processing unit (GPU), etc.), computer-readable storage device 307 (e.g., main memory, static memory, etc.), or combinations thereof which communicate with each other via a bus.

A processor 309 may include any suitable processor known in the art, such as the processor sold under the trademark XEON E7 by Intel (Santa Clara, Calif.) or the processor sold under the trademark OPTERON 6200 by AMD (Sunnyvale, Calif.).

Memory 307 preferably includes at least one tangible, non-transitory medium capable of storing: one or more sets of instructions executable to cause the system to perform functions described herein (e.g., software embodying any methodology or function found herein); data (e.g., portions of the tangible medium newly re-arranged to represent real world physical objects of interest accessible as, for example, a picture of an object like a motorcycle); or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Any suitable services can be used for storage 527 such as, for example, Amazon Web Services, memory 307 of server 511, cloud storage, another server, or other computer-readable storage. Cloud storage may refer to a data storage scheme wherein data is stored in logical pools and the physical storage may span across multiple servers and multiple locations. Storage 527 may be owned and managed by a hosting company. Preferably, storage 527 is used to store records 399 as needed to perform and support operations described herein.

Input/output devices 305 according to the invention may include one or more of a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof.

One of skill in the art will recognize that any suitable development environment or programming language may be employed to allow the operability described herein for various systems and methods of the invention. For example, systems and methods herein can be implemented using Perl, Python, C++, C#, Java, JavaScript, Visual Basic, Ruby on Rails, Groovy and Grails, or any other suitable tool. For a computing device 101, it may be preferred to use native xCode or Android Java.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A method for sharing content over a communication network comprising:
providing content, said content further comprising at least a first component and a second component, wherein at least one of the first and second components comprises an image, video, or text, wherein the first component and the second component comprise different media types, and wherein the first component modifies the second component;
receiving a first privacy parameter for the first component;
receiving a second privacy parameter for the second component;
distributing a copy of the first component to a first audience according to the first privacy parameter; and
distributing a copy of the second component to a second audience according to the second privacy parameter, wherein the first audience and the second audience are different and only an overlap audience comprising individuals belonging to both the first and second audiences can observe both the first and second components of the content; and
compiling the content from the first and second components and displaying the content to the overlap audience.

2. The method of claim 1 further comprising:
receiving a component designation; and
defining at least the first component and the second component according to the component designation.

3. The method of claim 1 wherein the copy of the first component is a volatile copy.

4. The method of claim 1 wherein the copy of the first component can be observed for only a set amount of time.

5. The method of claim 4 further comprising receiving the set amount of time.

6. The method of claim 1 wherein the copy of the first component can be observed for only a set number of sessions.

7. The method of claim 6 further comprising receiving the set number of sessions.

8. The method of claim 1 wherein the copy of the first component cannot be copied by the first audience.

9. The method of claim 1 wherein only the first audience can observe the copy of the first component.

10. The method of claim 1 wherein the first component comprises an image, video, text, or audio.

11. The method of claim 1 wherein the providing, receiving, and distributing steps are performed by a computer system comprising a processor coupled to a non-transitory memory.

12. The method of claim 11 wherein the computing device is a mobile device, a wearable computing device, a server, or an augmented reality device.

13. The method of claim 1 further comprising:
receiving a transition effect designation; and
distributing a transition effect, according to the transition effect designation, to an overlap audience comprising individuals belonging to both the first and second audiences;
wherein the transition effect is configured to be observed by the overlap audience between observation of the first component and observation of the second component.

14. A system for sharing content over a communication network, said system comprising a computing device coupled to a communication network and comprising a tangible, non-transitory memory coupled to a processor, the system operable to:
record content, said content comprising at least a first component and a second component, wherein at least one of the first and second components comprises an image, video, or text, wherein the first component and the second component comprise different media types, and wherein the first component modifies the second component;
receive a first privacy parameter for the first component;
receive a second privacy parameter for the second component;
distribute a copy of the first component to a first audience according to the first privacy parameter;
distribute a copy of the second component to a second audience according to the second privacy parameter, wherein the first audience and the second audience are different and only an overlap audience comprising individuals belonging to both the first and second audiences can observe both the first and second components of the content; and
compile the content from the first and second components and displaying the content to the overlap audience.

15. The system of claim 14 further operable to:
  receive a component designation; and
  define at least the first component and the second component according to the component designation.

16. The system of claim 14 wherein the copy of the first component is a volatile copy.

17. The system of claim 16 wherein the copy of the first component can only be observed for a set amount of time.

18. The system of claim 16 wherein the copy of the first component can be observed for only a set number of sessions.

19. The system of claim 14 wherein the copy of the first component cannot be copied by the first audience.

20. The system of claim 14 wherein only the first audience can observe the copy of the first component.

21. The system of claim 14 wherein the first component is an image, video, text, or audio.

22. The system of claim 14 further operable to
  receive a transition effect designation; and
  distribute a transition effect, according to the transition effect designation, to the overlap audience;
  wherein the transition effect is configured to be observed by the overlap audience between observation of the first component and observation of the second component.

* * * * *